No. 715,094. Patented Dec. 2, 1902.
C. S. LANGTON.
AUTOMATIC PUMP FOR PNEUMATIC TIRES.
(Application filed Dec. 26, 1901.)
(No Model.)
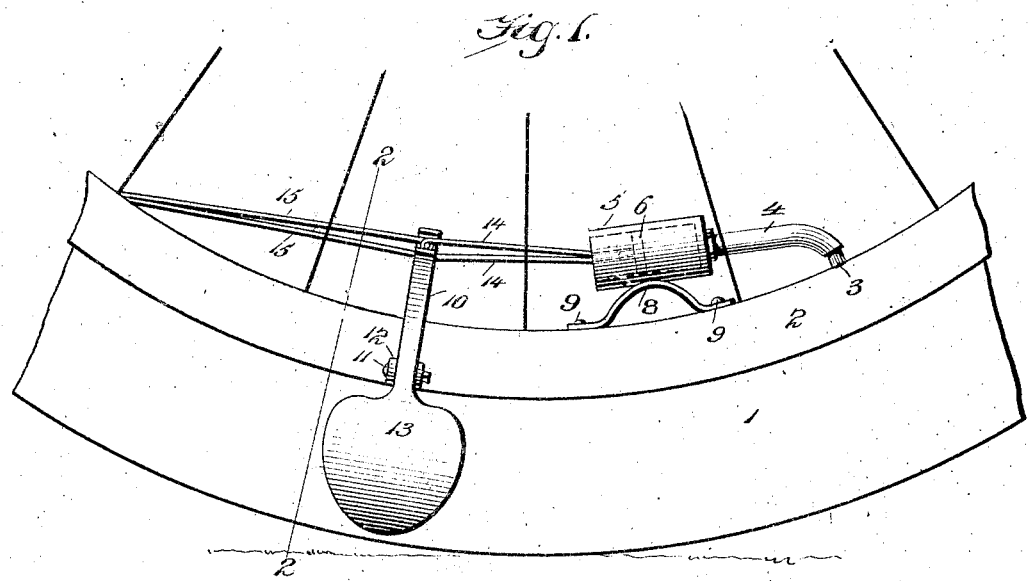
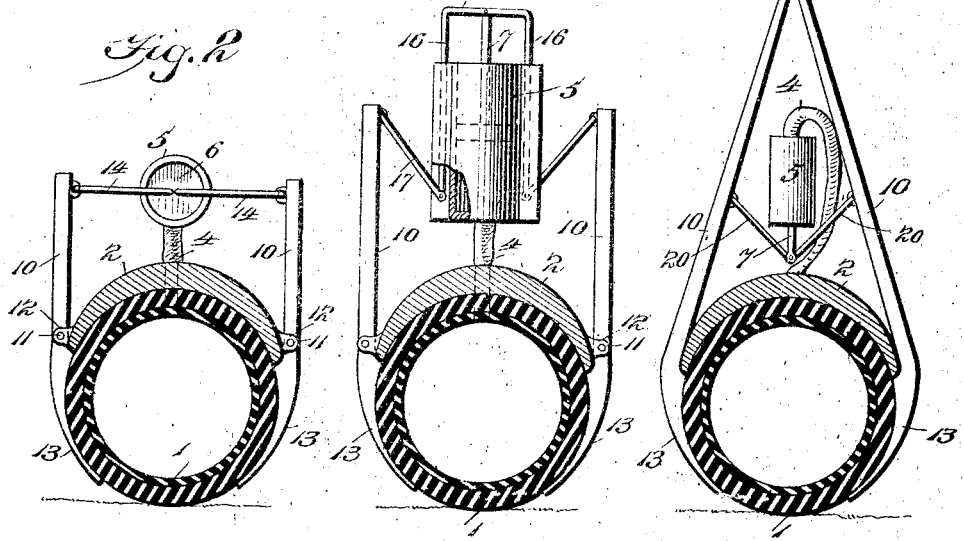
Witnesses
H. S. Dieterich
Chas. S. Hyer
Inventor
Charles S. Langton
By Victor J. Evans
Attorney

UNITED STATES PATENT OFFICE.

CHARLES S. LANGTON, OF PARKERSBURG, ILLINOIS.

AUTOMATIC PUMP FOR PNEUMATIC TIRES.

SPECIFICATION forming part of Letters Patent No. 715,094, dated December 2, 1902.

Application filed December 26, 1901. Serial No. 87,206. (No model.)

*To all whom it may concern:*

Be it known that I, CHARLES S. LANGTON, a citizen of the United States, residing at Parkersburg, in the county of Richland and State of Illinois, have invented new and useful Improvements in Automatic Pumps for Pneumatic Tires, of which the following is a specification.

This invention relates to automatic pumps for pneumatic tires, the object in view being to provide a simple, reliable, and efficient device applicable to the wheel-rim of a bicycle or other foot-propelled vehicle or automobile for the purpose of automatically inflating and regulating the inflation of the tires in connection with which the device is employed.

One of the objects of the invention is to so arrange the operative parts of the pump that advantage may be taken of the spreading action of a partially-inflated tire to operate the pump.

Another object of the invention is to provide against breakage or injury of the parts which are acted upon by the tire as it is compressed.

Another object is to construct the device as a whole in such manner that it is applicable to any wheel-rim, is self acting and regulating, and may be adjusted to produce any desired degree of inflation. The device is not connected with or related to any other operative part of the bicycle, automobile, or other machine, and therefore when the tire has been fully inflated the inflating device is automatically thrown out of operation, thus saving unnecessary wear on the operative parts of the pump.

With the above and other objects in view the invention consists in the novel construction, combination, and arrangement of parts hereinafter fully described, illustrated, and claimed.

In the accompanying drawings, Figure 1 is a side elevation of a portion of a wheel-rim and pneumatic tire, showing the automatic pump applied thereto. Fig. 2 is a cross-section through the same. Fig. 3 is also a cross-section showing a modified arrangement of pump connections, and Fig. 4 is also a cross-sectional view illustrating another modification in the form and arrangement of the pump-operating mechanism.

Similar numerals of reference designate corresponding parts in all the figures of the drawings.

In carrying out the present invention advantage is taken of the lateral spreading action of a partially-inflated pneumatic tire at the point of impact or at the lowest portion of the wheel where the tire touches the ground, the said spreading of the tire serving to operate an air-pump by means of suitable connections and the pump being placed in communication with an inflating-valve of any usual or preferred construction communicating with the interior of the tire to be inflated.

Referring to the drawings, 1 designates a pneumatic tire of any ordinary description; 2, the wheel-rim upon which the tire is placed, and 3 the valve-tube which communicates with the interior of the tire and contains the self-acting check-valve. Attached to the valve-tube 3 is a tubular connection 4, which may be either rigid or flexible, as occasion may require, said connection extending directly to the discharge end of an air-pump, 5 designating the pump-cylinder, 6 the piston, mounted to reciprocate therein, and 7 the pump-plunger which acts with the piston. Under the arrangement illustrated in Fig. 1, the pump is mounted on a bracket 8, which is connected to a wheel-rim at 9, the pump being small and located between adjoining spokes. As a means for operating the pump-piston I employ a pair of operating-levers 10, each of which is fulcrumed at 11 on a bracket 12, secured in any convenient manner to the rim at or near the edge thereof. Each of the levers is extended below its fulcrum, where it is provided with a broad shoe 13, said shoe being preferably thin and elastic and of a normal curvature corresponding with the outer surface of the tire 1. Each shoe extends partially beneath the tire, the lower edge thereof curving inwardly, and in view of the fact that said shoe is capable of springing or yielding it is allowed to give under impact with a stone or other hard obstacle, thus preventing injury to or fracture of said shoe. Links 14 are interposed between the upper ends of the levers 10 and the piston of the pump, as shown in Figs. 1 and 2, and other links or rods 15 are interposed between said levers and a point on the rim at the opposite side of said levers from the pump. The links 14 and 15 form, in effect, toggle arms or members, so that as the upper ends of the levers are moved inward the links 14 are caused to thrust the pump-piston lengthwise of the cylinder, and a predetermined amount of air is thereby forced through the connection 4 and valve-tube 3 into the tire. It will be understood that the shoes 13 are moved outward away from each other by reason of the action of the tire against said shoes when the tire is partially flattened and caused to spread laterally at the point of impact with the ground.

In a construction illustrated in Figs. 1 and 2 the pump is shown as arranged horizontally. In Fig. 3 the pump-cylinder is provided with longitudinally-arranged parallel flanges 15ª, providing longitudinal grooves 15ᵇ, and arranged vertically, or rather radially, with respect to the wheel-rim, with the discharge end of the cylinder toward the rim.

In order to operate the plunger 7, I provide an inverted-U-shaped slide-link 16, adapted to slide in the grooves 15ᵇ, and to the ends of which are pivotally connected links 17, each connected pivotally at its opposite ends to the upper extremities of the levers 10. The cross-head 18 of the slide-link connects centrally with the upper end of the plunger 7. By reason of the inclination of the links 17 as the upper extremities of the levers 10 are moved inward said links 17 serve to force the slide-link 16 and cross-head 18 downward, thereby operating the plunger, with the result above stated. Another arrangement is illustrated in Fig. 4, wherein the discharge end of the cylinder is disposed away from the rim or toward the center of the wheel. In this case it is necessary to provide for an upstroke of the plunger 7, which is accomplished by making the levers 10 somewhat longer and pivotally connecting them at their upper ends only, as shown at 19, some suitable provision in the form of a bracket being made for carrying or supporting the fulcrum-pin 19. Links 20 connect pivotally at one end with the levers 10 and at their opposite or inner ends with the lower extremity of the plunger 7. Therefore, as the shoes 13 are moved outward laterally the levers 10 are correspondingly spread apart, and this movement serves through the medium of the inclined links 10, which are in effect toggle-arms, to thrust the plunger 7 upward and force air through the tubular connection 4 into the tire.

From the foregoing description it will be understood that if the tire is at all soft or partially deflated it will spread at the point of impact with the ground and operate upon the shoes, which through the connections described will throw the pump into action and gradually reinflate the tire. It will also be understood that the device is self regulating and governing, being thrown into action as soon as the tire resoftens and being thrown out of action as soon as the requisite degree of inflation is obtained. By properly adjusting the links and other connections the pressure may be maintained at any desired degree of inflation.

I do not desire to be limited to the details of construction hereinabove described, and accordingly reserve the right to change, modify, or vary the construction within the scope of the appended claims.

Having thus described the invention, what I claim as new, and desire to secure by Letters Patent, is—

1. The combination with a wheel having a pneumatic tire mounted thereon, of a pump for inflating the tire, a U-shaped slide-link having the pump-piston connected therewith, levers adapted to be operated by the tire, and means connecting the levers and slide-link whereby the pump-piston may be reciprocated.

2. The combination with a wheel, having a pneumatic tire mounted thereon, of a pump for inflating the tire, a pair of toggle-links connected to the pump-piston and wheel-rim, and a pair of levers fulcrumed upon the wheel-rim, and having their upper ends connected to the toggle-links, the lower ends of said levers terminating in enlarged resilient shoes arranged on either side of the tire.

3. The combination with a wheel having a pneumatic tire mounted thereon, of a pump for inflating the tire, a U-shaped slide-link having the pump-piston connected therewith, levers fulcrumed upon opposite sides of the wheel-rim and adapted to lie in engagement with the tire, and links connecting the levers and slide-link.

4. The combination with a wheel, having a pneumatic tire mounted thereon, a pump having laterally-projecting flanges providing longitudinal grooves, an inverted-U-shaped slide-link having the pump-piston secured thereto, and adapted to work in said grooves, and means for operating the slide-link.

5. The combination with a wheel, having a pneumatic tire mounted thereon, of a pump having laterally-projecting flanges providing longitudinal grooves, an inverted-U-shaped slide-link having the pump-piston secured thereto, and adapted to work in said grooves, levers fulcrumed upon opposite sides of the wheel-rim and having their lower ends terminating in enlarged resilient shoes adapted to lie in engagement with the tire, and links connecting the slide-link and the levers.

In testimony whereof I affix my signature in presence of two witnesses.

CHARLES S. LANGTON

Witnesses:
FRANK D. CLARK,
AMOS JOHNSON.